(12) United States Patent
Shiino et al.

(10) Patent No.: US 6,799,900 B2
(45) Date of Patent: Oct. 5, 2004

(54) OPTICAL CONNECTOR FOR CONNECTING A PLURALITY OF FIBER RIBBONS TO ONE ANOTHER

(75) Inventors: Masato Shiino, Tokyo (JP); Hideki Miyazaki, Tokyo (JP); Katsuki Suematsu, Tokyo (JP); Takashi Shigenaga, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 197 days.

(21) Appl. No.: 10/094,233

(22) Filed: Mar. 6, 2002

(65) Prior Publication Data

US 2002/0168150 A1 Nov. 14, 2002

(30) Foreign Application Priority Data

| May 8, 2001 | (JP) | ........................................ 2001-137587 |
| Jun. 26, 2001 | (JP) | ........................................ 2001-192898 |
| Oct. 22, 2001 | (JP) | ........................................ 2001-323875 |

(51) Int. Cl.[7] ................................................ G02B 6/36
(52) U.S. Cl. ............................... 385/80; 385/14; 385/59
(58) Field of Search ............................... 385/77–80, 14, 385/59, 60, 70, 1.1, 1.24

(56) References Cited

U.S. PATENT DOCUMENTS

| 5,602,951 | A | * | 2/1997 | Shiota et al. ................... 385/81 |
| 5,815,621 | A | * | 9/1998 | Sakai et al. ..................... 385/80 |
| 6,010,249 | A | * | 1/2000 | Melchior et al. ............... 385/77 |
| 6,045,271 | A | | 4/2000 | Shimoji et al. |
| 6,062,740 | A | * | 5/2000 | Ohtsuka et al. ................ 385/81 |
| 6,219,479 | B1 | * | 4/2001 | Madden et al. ................ 385/46 |
| 6,256,448 | B1 | | 7/2001 | Shahid |
| 6,435,728 | B2 | * | 8/2002 | Shimoji et al. ................ 385/56 |
| 6,554,486 | B1 | * | 4/2003 | Takamatsu et al. ............ 385/75 |

FOREIGN PATENT DOCUMENTS

| JP | 06-118282 | 4/1994 |
| JP | 2000-081544 | 3/2000 |
| JP | 2000-284146 | 10/2000 |
| JP | 2000-310724 | 11/2000 |

* cited by examiner

*Primary Examiner*—Vip Patel
*Assistant Examiner*—Dalei Dong
(74) *Attorney, Agent, or Firm*—Knobbe, Martens, Olson & Bear, LLP

(57) ABSTRACT

A ferrule for optical connector has a body in which lines of fiber holes are arranged in a plurality of tiers. A cavity is formed in the body, and its bottom connects with the respective inlets of the fiber holes. The bottom of the cavity is a tiered bottom designed so that the respective inlet positions of the fiber holes are differentiated in stages between adjacent lines of the fiber hole array. The tiered bottom is formed having guide grooves that extend toward the respective inlets of the fiber holes in the same column of the fiber hole array. An opening is formed in a position of the outer surface of the body parallel to rows of the fiber hole array. The opening allows the tiered bottom to be exposed through the outer surface of the body.

21 Claims, 11 Drawing Sheets

OPTICAL CONNECTOR FOR CONNECTING A PLURALITY OF FIBER RIBBONS TO ONE ANOTHER

BACKGROUND OF THE INVENTION

1. Field of the Invention

The present invention relates to an optical connector for connecting a plurality of fiber ribbons to one another, and more particularly, to a ferrule that forms an optical connector.

2. Description of the Related Art

In general, various optical devices are connected by means of fiber ribbons. Usually, a ferrule for optical connector is used to attain this. A plurality of fiber ribbons can be collectively attached to the ferrule for optical connector. For example, m number of optical fibers can be kept arranged in an n-row matrix on a joint end face of the ferrule. Both "m" and "n" are algebraic numbers that are indicative of natural numbers not smaller than 2. Various optical devices can be easily connected with use of the ferrule for optical connector of this type.

SUMMARY OF THE INVENTION

The present invention disclosed on claimed herein, in one aspect thereof, comprises a ferrule. The ferrule comprises: a block-shaped body; a plurality of through holes formed in the body, the through holes being penetrated by optical fibers, individually; a hole array opening in the front end face of the body, the hole array being formed of a plurality of lines of the through holes arranged in a plurality of tiers; a cavity formed in the body, the cavity extending from the rear end face of the body into the body, connecting with the respective inlets of the through holes inside the body, and storing a part of a fiber ribbon having the optical fibers to be inserted individually into the through holes; an insertion opening formed in the rear end face of the body, the insertion opening allowing the cavity to open in the rear end face of the body and receiving the optical fibers to be inserted individually into the through holes; a tiered bottom forming the bottom of the cavity, the tiered bottom having a plurality of projections each formed with a guide groove for guiding each of the optical fibers toward the inlet of each of the through holes, the respective positions of the projections of the tiered bottom being differentiated in stages between adjacent columns of the hole array; and an opening formed in one of outer surfaces of the body parallel to rows of the hole array, the opening allowing the tiered bottom to be exposed through the one outer surface.

Further scope of applicability of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION

A ferrule for optical connector of the present invention can constitute an optical connector in a manner such that a plurality of optical fibers are passed therein. Single fibers are individual optical fibers that constitute a fiber ribbon having a plurality of optical fibers. The body of the ferrule is composed of a plastic molded piece, for example. A thermosetting resin such as an epoxy resin or a thermoplastic resin such as a PPS (polyphenylene sulfide) resin is a suitable material for the plastic molded piece. If a thermosetting resin is used as the material, the body is manufactured by the transfer molding method, for example. If a thermoplastic resin is used as the material, the body is manufactured by the injection molding method, for example.

A method is realized such that desired optical connections are formed between fiber ribbons in each of two ferrules for optical connector by butting the ferrules against each other.

These ferrules of the present invention may be variously modified or replaced with other ones. Although some embodiments of the invention will now be described by way of example, the scope of the invention is not limited to those embodiments.

Figure 1:
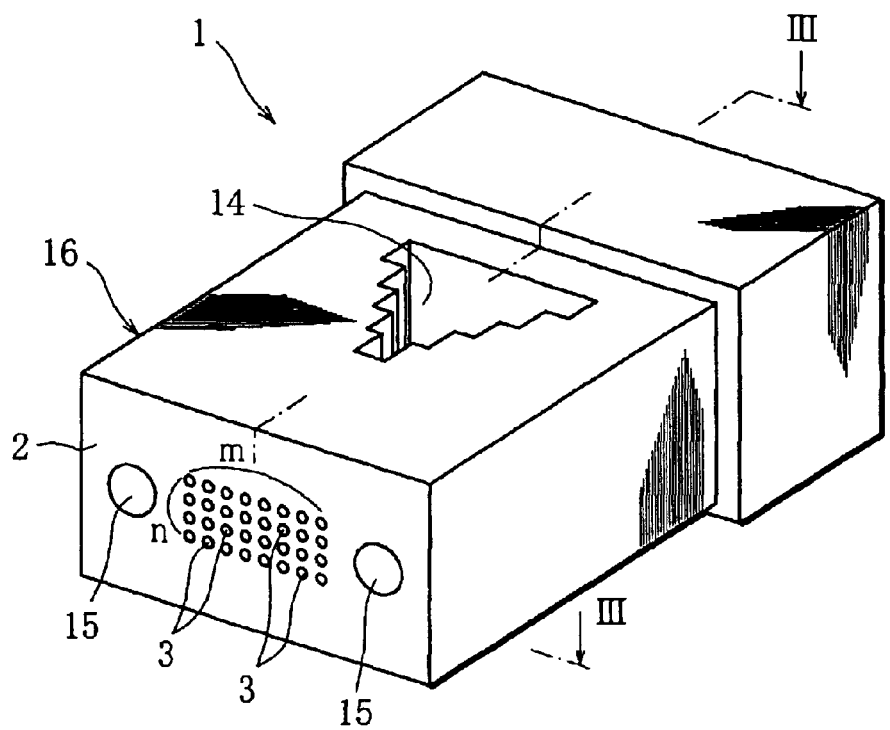
FIG. 1 is a perspective view showing an example of an embodiment of a ferrule for optical connector.
Figure 2:
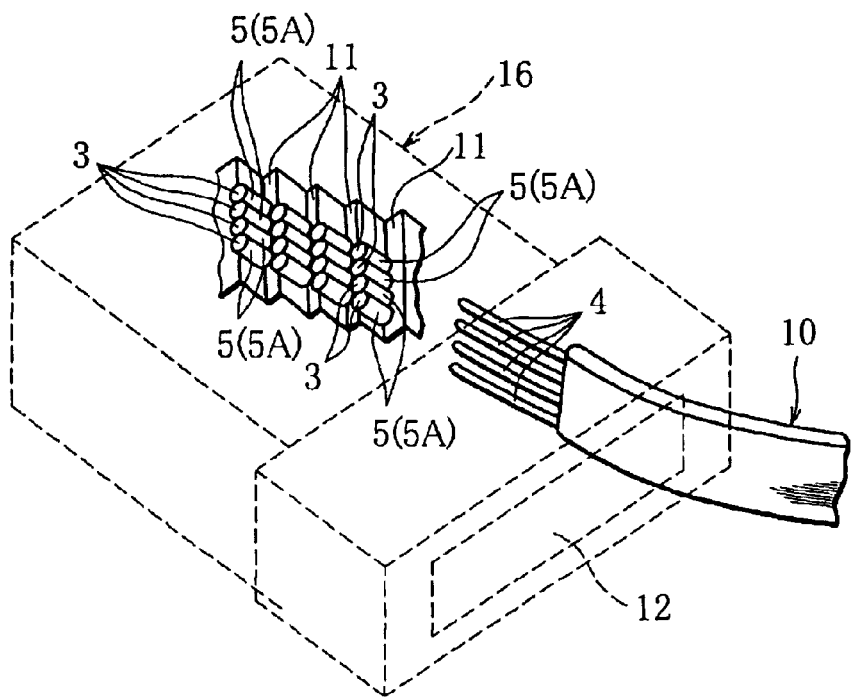
FIG. 2 is a view showing the internal structure of the ferrule for optical connector shown in FIG. 1.
Figure 3:
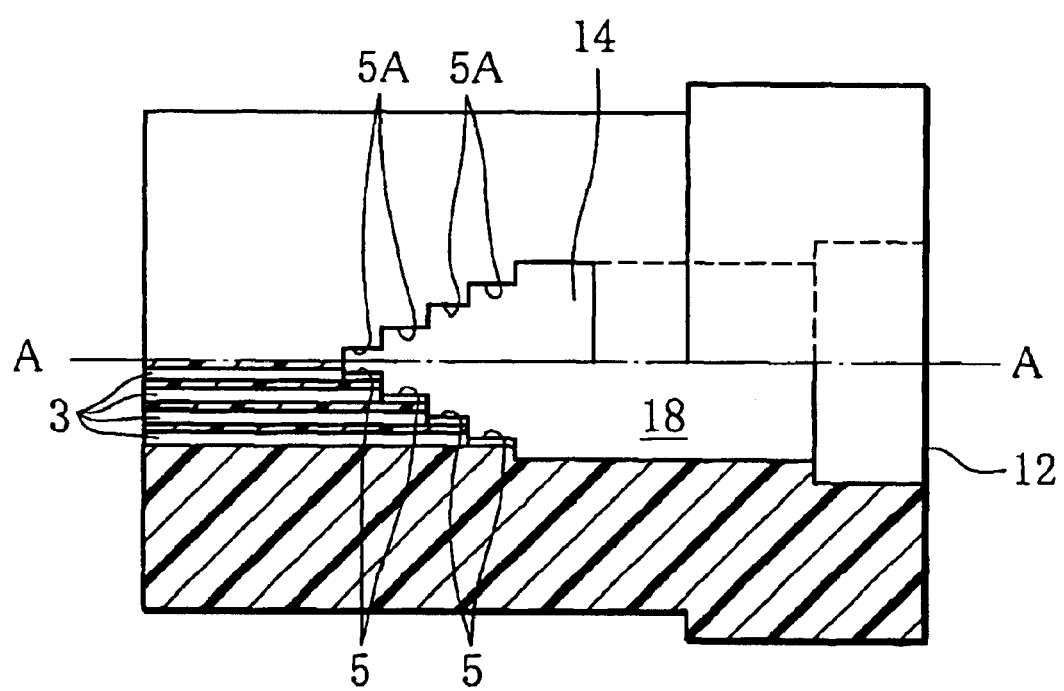
FIG. 3 is a plan view of the ferrule for optical connector including a sectional view taken along line II—II of FIG. 1.

Referring to FIGS. 1 to 3, there is shown a first embodiment of a ferrule 1 for optical connector. The ferrule 1 comprises a block-shaped body 16, which has a joint end face 2 on its front end. A pair of guide pin holes 15 and a large number of fiber holes 3 are formed extending from the joint end face 2 into the inner part of the body 16. The fiber holes 3 are situated between the two guide pin holes 15. More specifically, four lines of fiber holes 3, each including eight fiber holes 3, are arranged vertically between the paired guide pin holes 15. Thus, thirty-two fiber holes 3, in total, form an eight-by-four matrix.

An insertion opening 12 is formed in the rear end face of the body 16 that is situated on the side opposite from the joint end face 2. The body 16 is formed having therein a cavity 18 that extends from the insertion opening 12 toward its front end. The fiber holes 3 open in the bottom of the cavity 18 as viewed from the insertion opening 12. A fiber ribbon 10 is inserted into the body 16 through the insertion opening 12, and its bare optical fiber portions 4 are inserted individually into the fiber holes 3 from the bottom of the cavity 18. The inside diameter of each individual fiber hole 3 is substantially equal to the outside diameter of each optical fiber 4.

The body 16 has an injection hole 14 for an adhesive agent. As shown in FIG. 1, the injection hole 14 opens in the upper surface of the body 16 and extends at right angles to the direction of insertion of the fiber ribbon 10 in the body 16. The injection hole 14 allows the bottom of the cavity 18 to be also seen from above the body 16. The fiber ribbon 10 is fixed to the body 16 with an adhesive agent or the like in a manner such that it is inserted in the body 16. In this state, the adhesive agent can be injected into the injection hole 14.

As shown in FIG. 2, the bottom of the cavity 18 is tiered by forming base portions 11, each base portion 11 has guide grooves 5. The guide groove 5 is formed in a position short of each fiber hole 3. The guide grooves 5 serve individually to guide the optical fibers 4 from the insertion opening 12 into their corresponding fiber holes 3.

Guide groove groups 5A are formed in positions short of the columns of the fiber holes 3, as viewed in the direction of insertion of the fiber ribbon 10. Each guide groove group 5A includes guide grooves 5 as many as the fiber holes 3 in each column. Thus, each guide groove group 5A includes four guide grooves 5 arranged vertically in a column, and eight guide groove groups 5A are arranged horizontally at the bottom of the cavity 18, as shown in FIG. 2.

As shown in FIG. 2, moreover, the respective starting ends of all the guide grooves 5 in each guide groove group 5A are flushed in the direction of insertion of the fiber ribbon 10. On the other hand, the positions of the respective starting ends of the laterally adjacent guide grooves 5 are varied in stages. More specifically, the positions of the respective starting ends of the guide grooves 5 are differentiated in tiers from the center to the opposite sides, as viewed across the matrix of the fiber holes 3, as shown in FIG. 3. This is done because the bottom of the cavity 18 is tiered. Further, the fiber holes 3 open in each stair of the tiered bottom of the cavity 18, and the respective starting ends of the guide grooves 5 are formed gouging the nosing of each stair.

The body 16 has a shape such that its opposite sides are symmetrical with respect to a straight line (dashed line A—A shown in FIG. 3) that passes its center, as viewed across the matrix of the fiber holes 3. Accordingly, deformation of the body 16 that is attributable to contraction of the resin material can be effectively restrained in the process of formation of the body. Thus, the resulting ferrule has a highly precise shape. If the adhesive agent that is supplied to fix the optical fibers contracts, moreover, deformation can be prevented from being caused thereby. Deformation attributable to change of temperature can be also prevented. Thus, an optical connector with very high performance can be constructed with use of this ferrule 1 for optical connector.

The ferrule 1 for optical connector of the first embodiment has the aforesaid configuration at the least. As shown in FIG. 2, therefore, the optical fibers 4 of the four-core fiber ribbon 10 can be guided by means of the guide grooves 5 as they are passed individually through the fiber holes 3 after the fiber ribbon 10 is inserted upright into the insertion opening 12.

If an operator who is expected to pass the optical fibers 4 into the fiber holes 3 views the interior of the cavity 18 through the injection hole 14, he/she can securely recognize the respective starting ends of the guide grooves 5 that connect with the fiber holes 3 concerned. The reason is that the respective starting ends of the guide grooves 5 are situated in the nosing of each stair at the bottom of the tiered cavity 18, so that the operator never fails to see the stair sideways, as shown in FIG. 3, if he/she views the inner surface of the cavity 18 through the injection hole 14.

Figure 9:
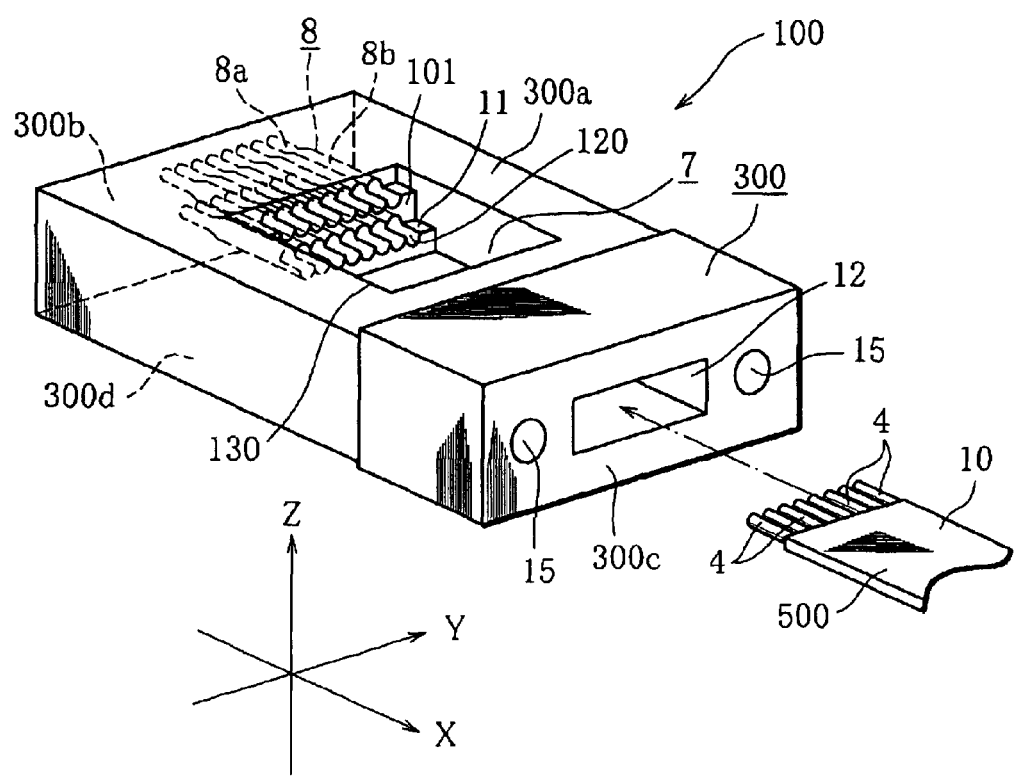
FIG. 9 is a perspective view schematically showing a prior art example of the ferrule for optical connector.

In the case of a conventional ferrule 100 shown in FIG. 9, on the other hand, it is hard for the operator to recognize the respective starting ends of guide grooves 120 that connect individually with fiber holes 8 through which the optical fibers 4 are to be passed when the operator views the interior of a cavity 7 through an injection hole 130. This is because if the operator views the interior of the cavity 7 through the injection hole 130, then he/she sees stairs from above. Thus, the adjacent stairs look as if they were flush, so that it is hard visually to recognize the difference in level between the stairs. In these circumstances, there is a possibility of the operator wrongly guiding the fiber ribbon 10 to an untargeted stair.

In the case of the ferrule 1 for optical connector according to the first embodiment, in contrast with this, the operator can easily recognize the difference in level between the adjacent stairs. Therefore, the operator can securely discriminate the respective starting ends of the guide grooves 5 that connect individually with the fiber holes 3 through which the optical fibers 4 are to be passed. Thus, the fiber ribbon 10 cannot be guided to a wrong stair.

Figure 4:
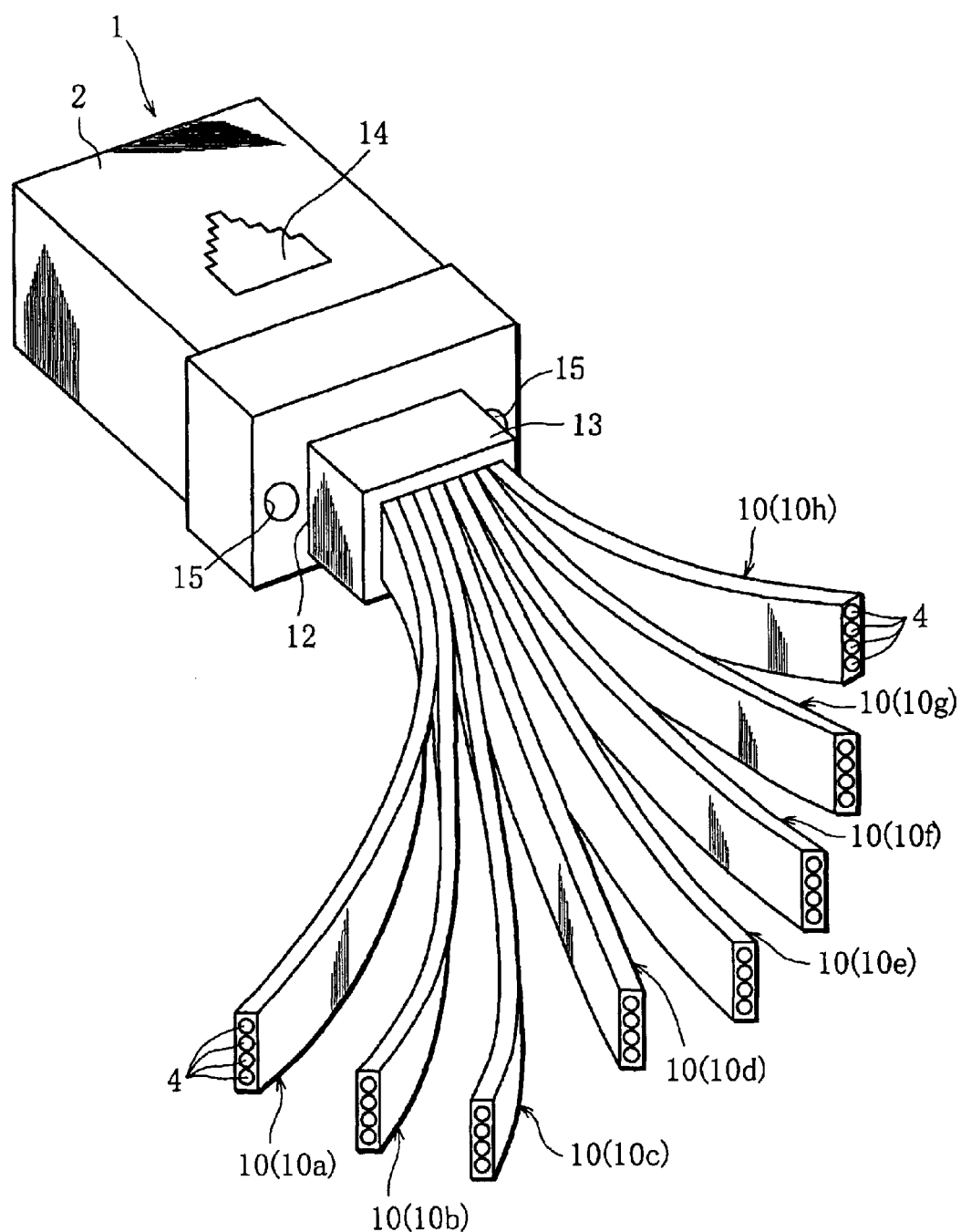
FIG. 4 is a perspective view showing an optical connector assembled by attaching optical fibers to the ferrule for optical connector shown in FIG. 1.

With use of the ferrule 1 for optical connector of the first embodiment, as shown in FIG. 4, an optical connector can be assembled combining eight four-core fiber ribbons 10a to 10h at the maximum. In inserting the fiber ribbons 10 into the insertion opening 12, it is advisable to insert the fiber ribbons 10 into a rubber boot 13 after the boot 13 is inserted into the insertion opening 12.

Figure 5:
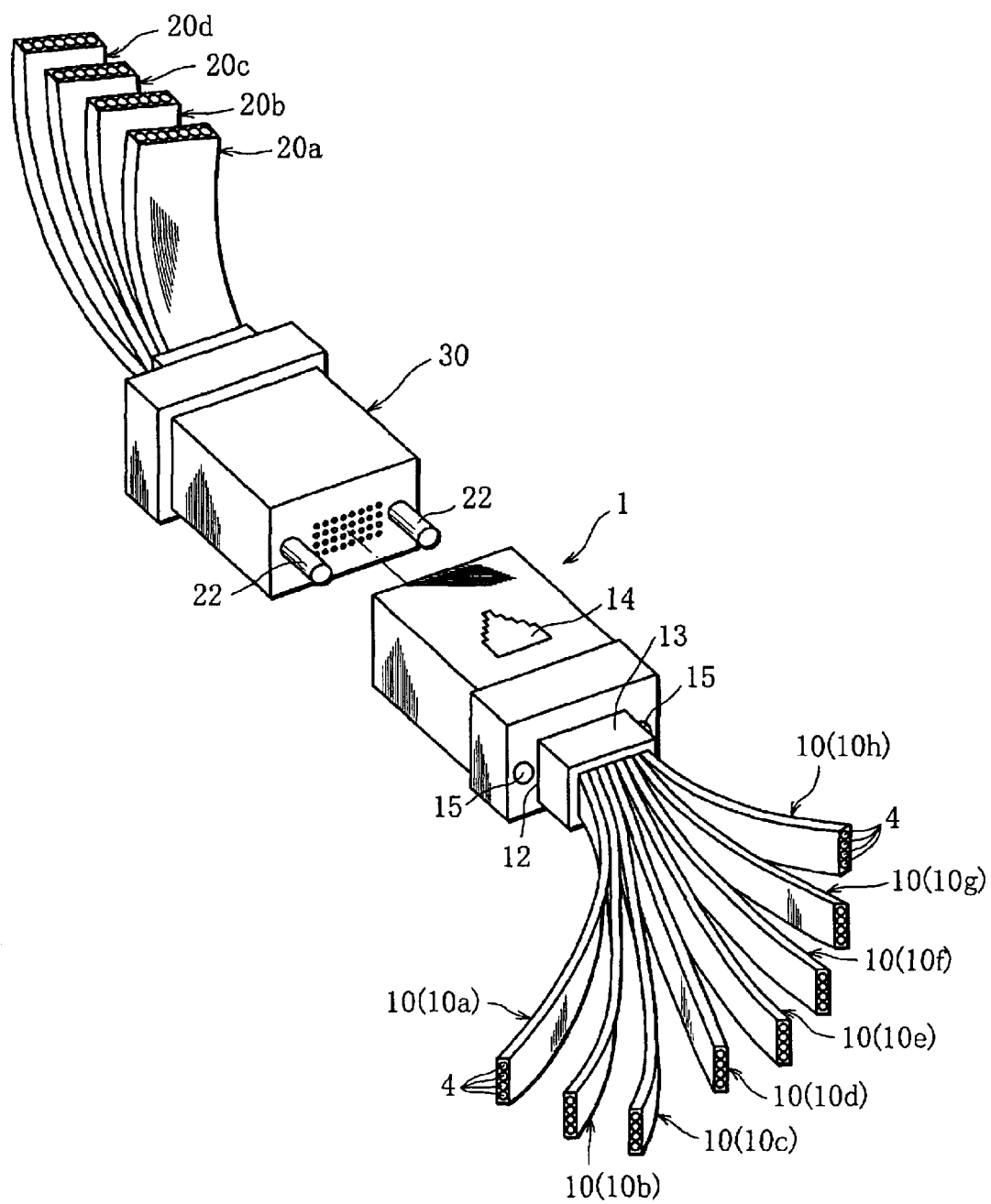
FIG. 5 is a perspective view illustrating the way a plurality of fiber ribbons are connected by means of an optical connector.

FIG. 5 shows the way the fiber ribbons are connected by means of two optical connectors. One of the optical connectors has an existing ferrule 30 for optical connector. Four eight-core fiber ribbons 20a to 20d, for example, are inserted flat into the ferrule 30 and fixed.

Further, the existing ferrule 30 for optical connector is provided with a pair of guide pins 22. The guide pins 22 are passed individually through the guide pin holes 15 of the ferrule 1 for optical connector of the first embodiment, and the two optical connectors are connected to each other by butting. Thereupon, optical connection and transformation of arrays are realized between the fiber ribbons 10a to 10g and the fiber ribbons 20a to 20d. More specifically, the four optical fibers 4 that constitute the four-core fiber ribbon 10a are optically connected to the their corresponding specific optical fibers of the eight-core fiber ribbons 20a, 20b, 20c and 20d. The optical fibers that constitute each of the four-core fiber ribbons 10b to 10h are optically connected in like manner, whereupon the aforesaid optical connection and transformation of arrays are realized.

Figure 6:
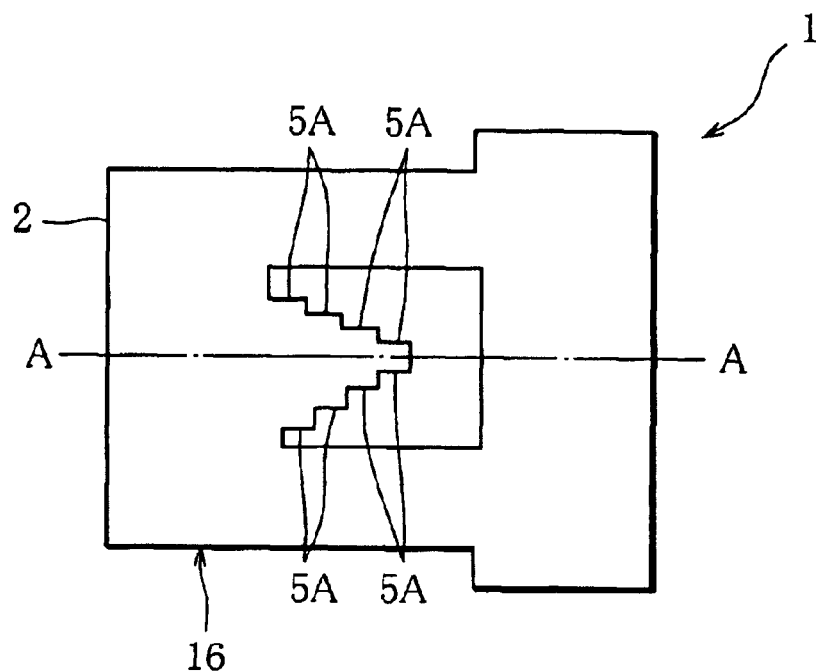
FIG. 6 is a plan view showing another embodiment of the ferrule for optical connector.

FIG. 6 shows a ferrule 1 for optical connector of a second embodiment. In this case, the bottom of a cavity 18 is tiered in the direction opposite to the case shown in FIG. 2, and the positions of the respective starting ends of guide grooves 5A are different between laterally adjacent columns. This second embodiment can produce the same effects of the ferrule 1 for optical connector of the first embodiment.

Figure 7:
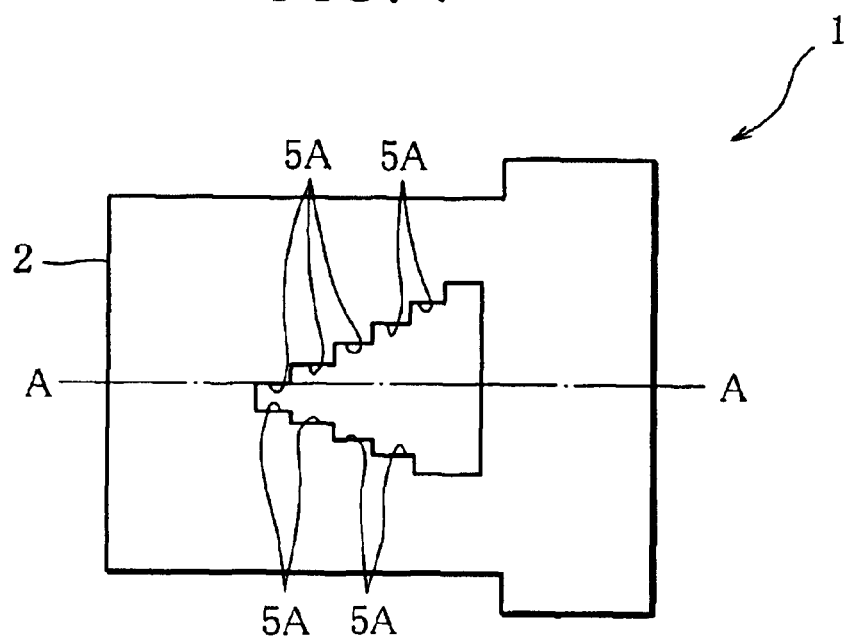
FIG. 7 is a plan view showing another embodiment of the ferrule for optical connector of FIG. 1.
Figure 8:
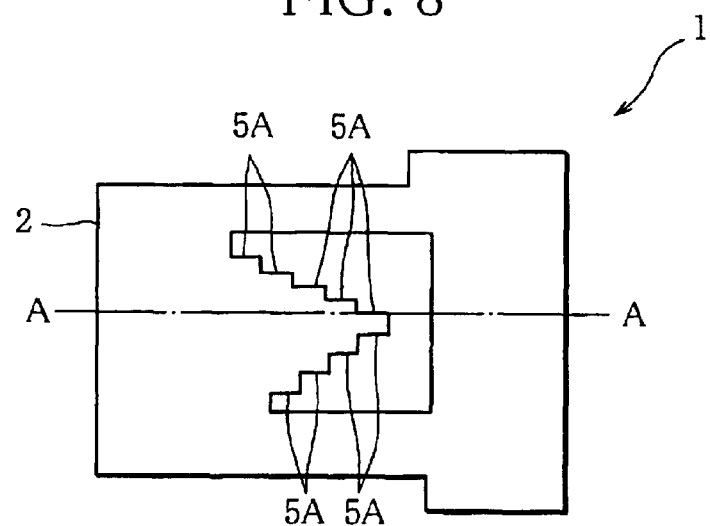
FIG. 8 is a plan view showing another embodiment of the ferrule for optical connector of FIG. 6.

As shown in FIGS. 7 and 8, an odd number of columns of fiber holes may be formed in each of the ferrules 1 for optical connector of the first and second embodiments. It is to be understood, in this case, that the number of guide groove groups may be changed corresponding to the number of columns of fiber holes. In the case where an odd number of columns of fiber holes are formed, the opposite sides of the resulting structure, as viewed across the matrix of the fiber holes, are not perfectly but substantially symmetrical with respect to a straight line A—A that passes the center of the structure. However, this configuration is symmetrical enough to prevent various deformations of the body 16.

An example of a conventional ferrule for optical connector will be described prior to a description of a third embodiment of the ferrule for optical connector.

FIG. 9 is a schematic perspective view showing a prior art example of the ferrule for optical connector. This ferrule 100 is provided on a connecting end portion of a fiber ribbon 10, and has a body 300 of a resin, for example. The fiber ribbon 10 has a plurality of optical fibers 4, which are arranged side by side and covered by means of a shell 500. The connecting end portion of the fiber ribbon 10 is cleared of the shell 500, so that the respective connecting end portions of the optical fibers 4 are exposed.

In this prior art example, a plurality of fiber ribbons 10 constructed in this manner are connected to the ferrule 100 in a manner such that they are stacked in layers in the vertical direction (Z-axis direction). The ferrule 100 shown in FIG. 9 is fitted with the respective connecting end portions of two fiber ribbons 10 in tiers. As in the following prior art example, however, some ferrules may be fitted with the respective connecting end portions of three or more fiber ribbons 10.

Figure 10:
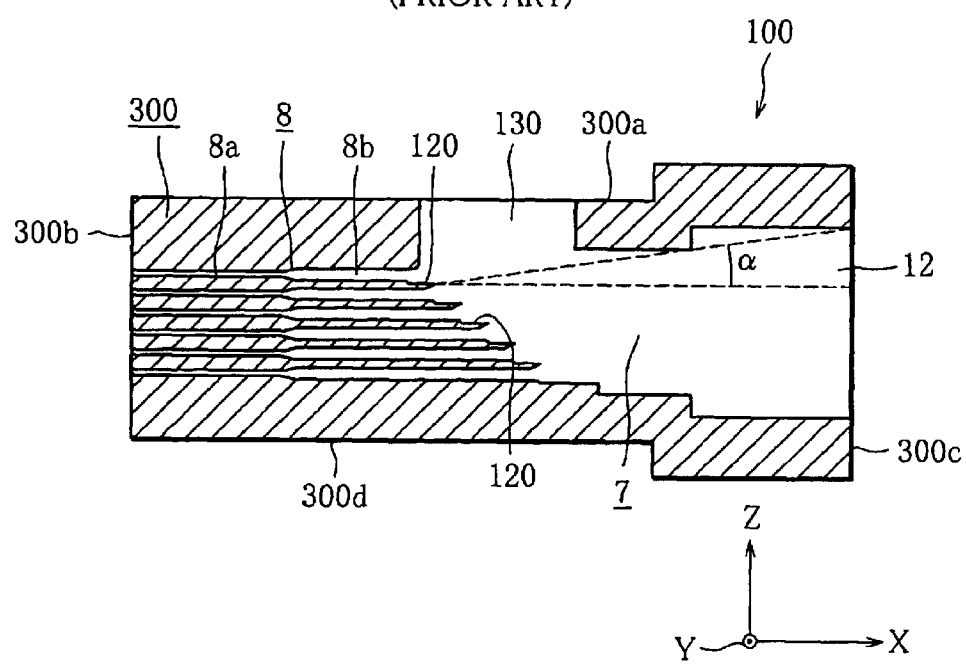
FIG. 10 is a sectional view showing another prior art example of the ferrule for optical connector.

Referring to FIG. 10, there is shown a prior art example of the ferrule 100 that is fitted with the respective connecting end portions of six fiber ribbons 10. FIG. 10 is a sectional view of the ferrule 100 taken along the X-axis.

An insertion opening 12 is formed in a rear end face 300c of a body 300 of the ferrule 100. The body 300 is formed having therein a cavity 7 that communicates with the insertion opening 12. The insertion opening 12 is an opening into which a plurality of exposed optical fibers 4 of fiber ribbons 10 are inserted in common. All the optical fibers 4 from the insertion opening 12 are passed through the cavity 7.

A plurality of fiber holes 8 are formed in that part of the body 300 which is situated in front of the cavity 7. The fiber holes 8 penetratingly extend in the longitudinal direction (X-axis direction) from the cavity 7 to a connecting end face 300b of the body 300. The connecting end portion of one single fiber 4 can be passed through each fiber hole 8.

In this prior art example, the fiber holes 8 are also arranged in matrix-shaped tiers. In this prior art example, moreover, each fiber hole 8 includes a small-diameter portion 8a on the connecting end face side and an inlet portion 8b on the cavity side. The small-diameter portion 8a is a passage that has an inside diameter substantially equal to the outside diameter of each single fiber 4 and a substantially circular cross section. The inlet portion 8b is a passage that communicates with the small-diameter portion 8a and has a diameter larger than the small-diameter portion 8a.

The fiber holes 8 open in a bottom 101 of the cavity 7. The bottom 101 is tiered. More specifically, as viewed from the insertion opening 12, stairs of the bottom 101 form a descent toward the connecting end face 3b of the body 300. The descending direction of the descent is coincident with the direction of advance toward a surface 3a.

The tread of each stair of the bottom 101, as viewed from the insertion opening 12, is formed having an opening row of fiber holes 8 corresponding individually to the single fibers 4. Further, a base portion 11 of each stair of the bottom 101, as viewed from the insertion opening 12, is formed having guide grooves 120 for guiding the optical fibers 4 individually into the fiber holes 8.

An injection hole 130 for an adhesive agent that communicates with the cavity 7 is formed in a surface 300a of the body 300. The guide grooves 120 can be easily seen from the outside of the body 300 through the injection hole 130.

In connecting the respective connecting end portions of a plurality of fiber ribbons 10 to the ferrule 100 constructed in this manner, the operator first inserts the connecting end portion of the fiber ribbon 10 that is to be situated in the lowest tier into the cavity 7 through the insertion opening 12. Then, the operator fill the exposed optical fibers 4 into their corresponding guide grooves 120 in the lowest tier while visually checking the interior of the cavity 7. Subsequently, the operator advances the optical fibers 4 along the guide grooves 120 toward the connecting end face 300b, and inserts them into their corresponding fiber holes 8.

Then, the operator inserts the connecting end portion of the fiber ribbon 10 that is to be situated in the lowest tier but one, as viewed from the injection hole 130, into the cavity 7 through the insertion opening 12. While visually checking the interior of the cavity 7 through the injection hole 130, moreover, the operator inserts the optical fibers 4 into their corresponding fiber holes 8, utilizing the guide grooves 120 in the lowest tier but one.

Thus, the operator inserts the individual optical fibers 4 of the fiber ribbons 10 into their corresponding fiber holes 8 in an ascending manner, as viewed from the injection hole 130.

After a predetermined number of optical fibers 4 are inserted into their corresponding fiber holes 8, the adhesive agent is injected into the cavity 7 through the injection hole 130. When the adhesive agent sets up, the respective connecting end portions of the fiber ribbons 10 are fixed to the body 300. In this manner, the fiber ribbons 10 can be attached to the ferrule 100.

The prior art example described above has the following problems.

Figure 11A:
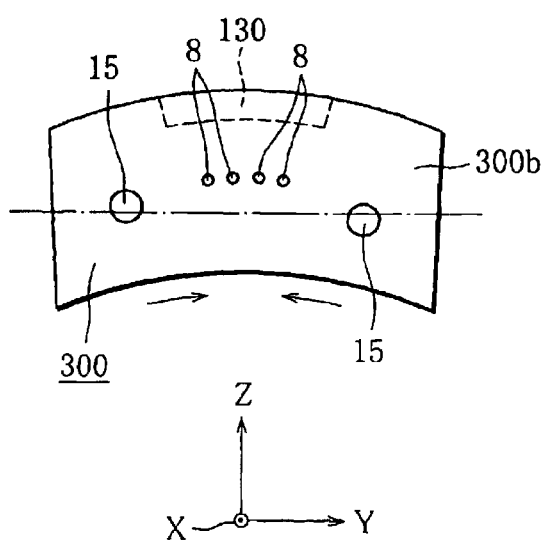
FIGS. 11A and 11B are views for illustrating problems of the prior art.

In the prior art ferrule 100, the injection hole 130 is formed in the surface 300a of the body 300. In manufacturing the body 300 by various molding methods, therefore, contraction on the side of its surface 300a is smaller than contraction on the side of its undersurface 300d. In some cases, therefore, the body 300 may be bent, as shown in FIG. 11A.

Figure 11B:
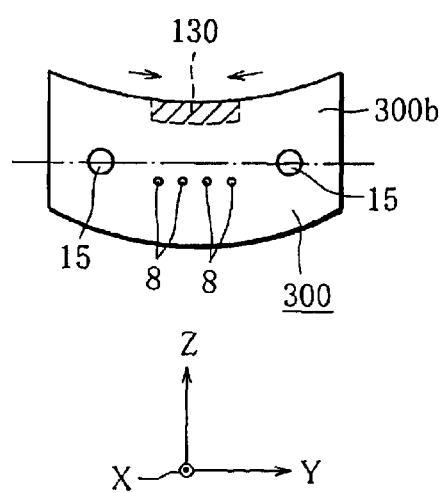

The adhesive agent injected into the cavity 7 through the 130 contracts as it sets up. In some cases, therefore, tensile force that is attributable to the contraction of the adhesive agent may acts on the surface 300a, thereby causing the body 300 to bend, as shown in FIG. 11B.

If the injection hole 130 is thus formed in the surface 300a of the body 300, the body 300 sometimes may be bent and distorted during its manufacturing processes. This distortion of the body 300 may possibly cause the respective openings of the fiber holes 8 in the connecting end face 300b to be dislocated from designed positions. If the respective bending end faces of the optical fibers 4 that are exposed from the openings of their corresponding fiber holes 8 are expected to be connected to the joint end faces of the fellow optical fibers 4, in this state, dislocation is caused between the respective joint end faces of the optical fibers 4, so that satisfactory optical connection cannot be ensured.

In the ferrule 100 of the prior art example constructed in this manner, the length of the bottom 101 of the cavity 7, as viewed in the longitudinal direction of the body 300, is settled depending on the number of stairs and the length of the guide grooves 120. However, the guide grooves 120 require a certain length that ensures fulfillment of their original function as guide means. In practice, therefore, the length of the bottom 101, as viewed in the longitudinal direction of the body 300, is inevitably settled depending on the number of stairs alone.

If the number of tiers for the fiber ribbons 10 to be attached to the ferrule 100 is expected to be increased, therefore, the number of tiers for the fiber holes 8 must be increased inevitably, so that the number of stairs of the bottom 101 increases. Thus, in this case, the length of the bottom 101, as viewed in the longitudinal direction of the body 300, should be extended.

It is to be desired, on the other hand, that all the guide grooves 120 should be able to be easily seen through the injection hole 130. If the length of the bottom 101, as viewed in the longitudinal direction of the body 300, is extended, therefore, the length of the injection hole 130 must be also extended correspondingly.

However, the size of the ferrule 100 is substantially fixed to meet standard requirements. If the length of the injection hole 130 is thus extended, therefore, the ratio of the size of the injection hole 130 to the area of the surface 300a of the ferrule 100 increases. Accordingly, the degree of imbalance between contraction on the side of the surface 300a and contraction on the side of the undersurface 300d heightens, so that deformation of the body 300 grows inevitably. With the progress of the modern optical communication networks, moreover, the number of fiber ribbons 10 to be attached to the ferrule 100 tends to increase, so that the deformation of the body 300 that is attributable to the presence of the injection hole 130 arouses a more serious problem.

If the length of the bottom 101, as viewed in the longitudinal direction of the body 300, is extended, moreover, the respective treads of the stairs that are located deeper in the body 300 are farther from the insertion opening 12. Thus, an angle α of insertion of the optical fibers 4 (i.e., angular range indicative of a region for the insertion of the optical fibers 4 that allows the operator to bring the respective connecting end portions of the optical fibers close to specific fiber hole 8) is so narrow that the insertion of the optical fibers 4 is a hard task.

A ferrule 1 for optical connector of a third embodiment can solve the problems of the prior art example described above and produce better effects. The ferrule 1 of the third embodiment is designed mainly to provide a structure such that deformation of a body that is attributable to the presence of an injection hole can be prevented, fiber ribbons can be easily inserted into fiber holes, that inserted optical fibers can be optically connected to their mates in good conditions.

Figure 12:
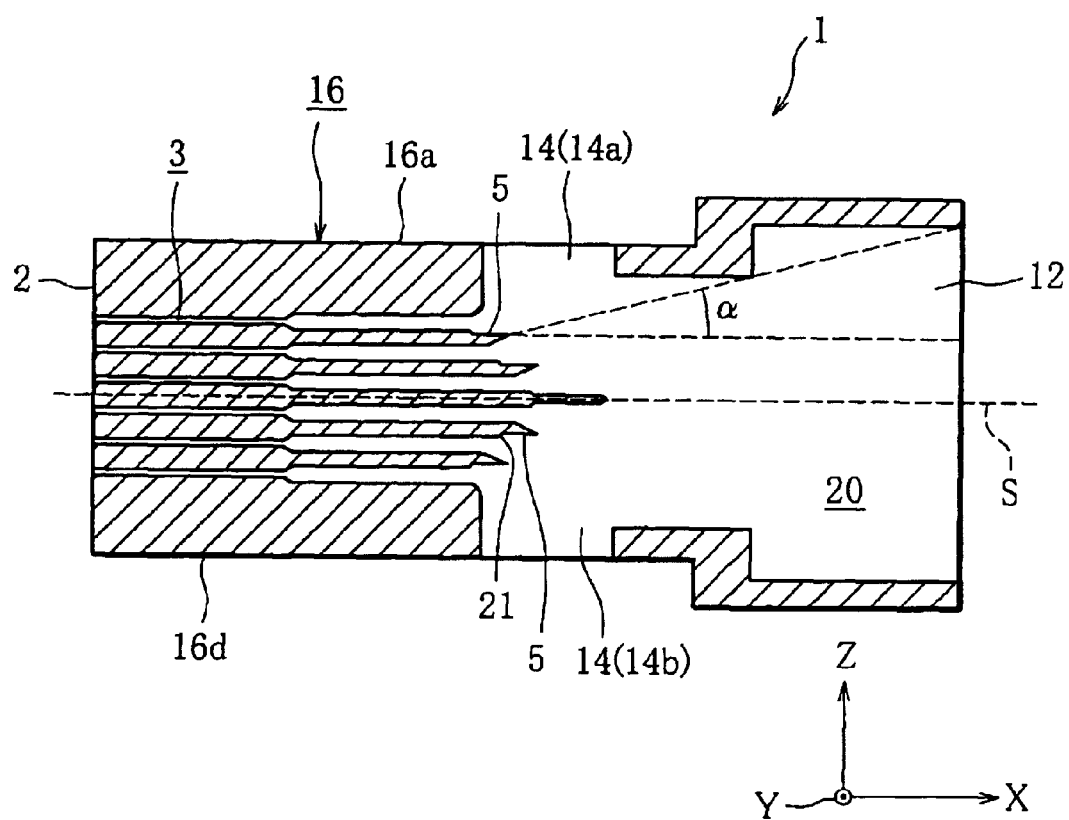
FIG. 12 is a sectional view showing a ferrule for optical connector of a third embodiment.

FIG. 12 is a schematic sectional view showing the ferrule 1 for optical connector of the third embodiment. In the third embodiment, injection holes 14a and 14b open in upper and lower surfaces 16a and 16b, respectively, of a body 16. The injection holes 14a and 14b both communicate with a cavity 20 in the body 16 and are opposed to one another. They have the same shape and size.

A bottom 21 of the cavity 20 of the third embodiment is tiered in a direction different from the directions of the stairs of the first and second embodiments. More specifically, stairs on the bottom 21 ascend from the center, as viewed in the direction of tiers of a matrix of fiber holes 3, toward the upper and lower surfaces 16a and 16d. The ascending direction of the stairs is coincident with the direction of advance toward a joint end face 2 of the body 16. As viewed from an insertion opening 12, the stairs descend toward the joint end face 2 of the body 16, and the descending direction is coincident with the direction of advance toward the upper and lower surfaces 16a and 16d.

According to the third embodiment, the injection holes 14 and the bottom 21 have peculiar configurations such that the body 16 is vertically symmetrical with respect to a symmetrical plane S that contains the upper and lower surfaces 16a and 16d and the central portion. According to the third embodiment, moreover, the body 16 is bisymmetrical as viewed from the joint end face 2.

According to this third embodiment, the paired injection holes 14a and 14b are located in regions that are opposed to each other in the vertical direction of the body 16. Therefore, the degrees of contraction on the sides of the upper and lower surfaces 16a and 16d of the body 16, formed of a resin material, are substantially equal when the body 16 is molded, so that the body 16 can be prevented from bending. As the adhesive agent injected into the cavity 20 through the injection holes 14a and 14b sets up, moreover, tensile force that is attributable to the contraction of the adhesive agent acts substantially equally on the upper and lower surfaces 16a and 16d of the body 16, so that the states of the upper and lower surfaces are balanced. Thus, according to the ferrule 1 for optical connector of the third embodiment, deformation of the body 16 attributable to the injection holes 14 can be restrained.

In this manner, according to the third embodiment, the body 16 can be manufactured substantially as designed, and the ferrule 1 for optical connector can be utilized for satisfactory optical connection of fiber ribbons.

Since the injection holes 14a and 14b are formed in the upper and lower surfaces of the body 16, respectively, moreover, the bottom 21 of the cavity 20 can be formed having the aforementioned peculiar configuration. If the number of tiers for the fiber hole lines is increased, therefore, the length of the bottom 21, as view in the longitudinal direction of the body 16, can be made shorter than in the conventional case.

Since the length of the bottom 21 in the longitudinal direction can be restricted in this manner, the cavity 20 and the injection holes 14 can be prevented from being unduly increased in size. As the cavity 20 and the injection holes 14 are enlarged, the resin part of the body 16 is reduced correspondingly, so that the probability of deformation of the body 16 heightens. According to the third embodiment, however, the cavity 20 and the injection holes 14 can be prevented from being enlarged, so that the number of fiber ribbons that can be held in the ferrule 1 for optical connector can be increased without failing to prevent deformation of the body 16.

Since the length of the bottom 21 of the cavity 20 in the longitudinal direction can be restricted, moreover, the distance between the insertion opening 12 and the respective openings of the fiber holes 3 can be made shorter than in the conventional case. Thus, the angle α of fiber insertion can be increased, so that the optical fibers 4 can be easily inserted into their corresponding fiber holes 3.

Figure 13A:
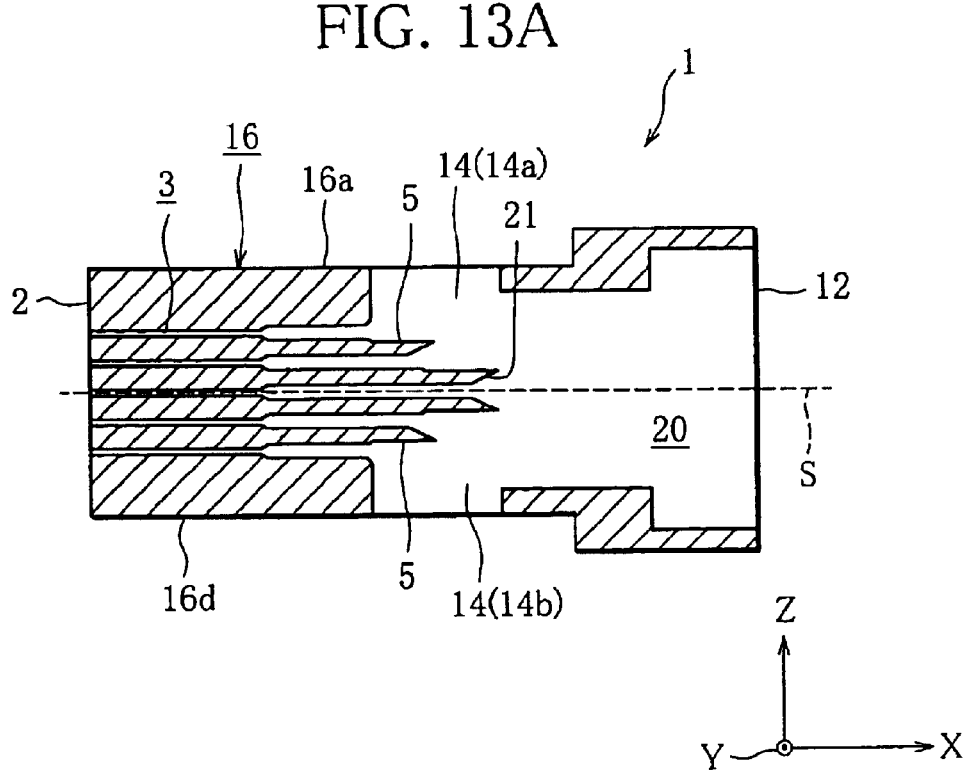
FIGS. 13A and 13B are sectional views showing cases where the number of tiers for fiber holes is an odd number.

In the example shown in FIG. 12, the fiber hole lines formed in the body 16 are arranged in six tiers. However, the number of tiers is not limited to six and may be set at any other suitable value. FIG. 13A is a sectional view showing an example in which fiber hole lines are arranged in five tiers.

In the case where the number of tiers for the fiber hole lines is an odd number, as shown in FIG. 13A, guide grooves 5 cannot be formed in the fiber holes 3 in the central tier if the body 16 is expected to be vertically symmetrical. Therefore, it is hard to insert the respective connecting end portions of the optical fibers 4 into the fiber holes 3 in the central tier.

Figure 13B:
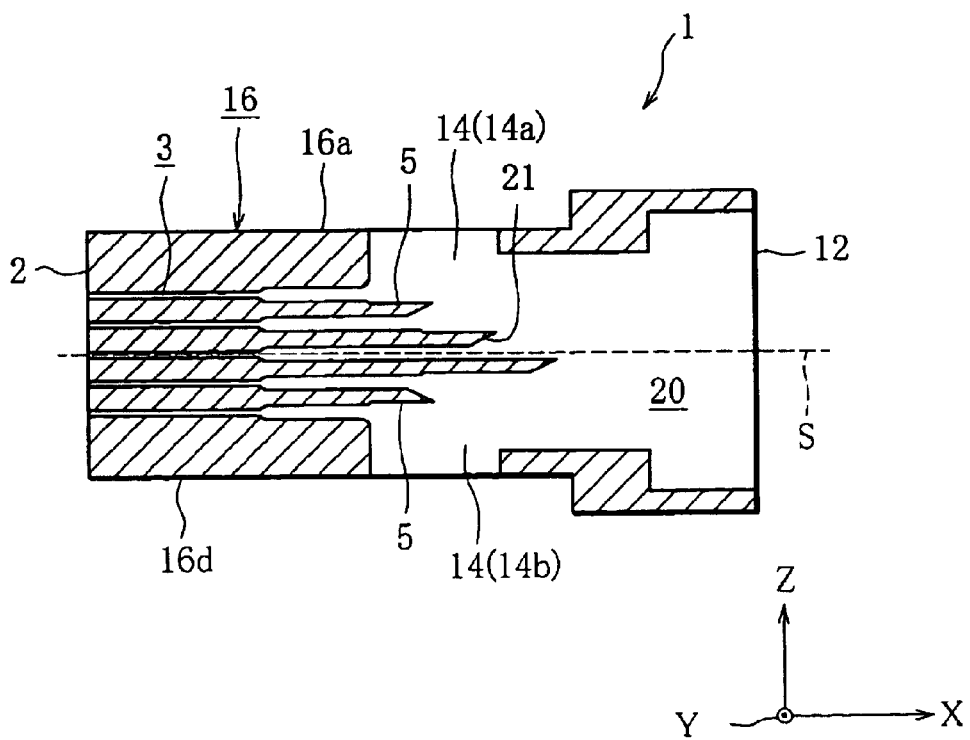

In consideration of this point, it is advisable to use the form shown in FIG. 13B in the case where the number of tiers for the fiber hole lines is an odd number. In this case, guide grooves 5 are also formed in positions short of the fiber holes 3 in the central tier. To be exact, therefore, the body 16 is not vertically symmetrical. Since the body 16 is substantially vertically symmetrical, however, it can produce the same effects as aforesaid.

Figure 14:
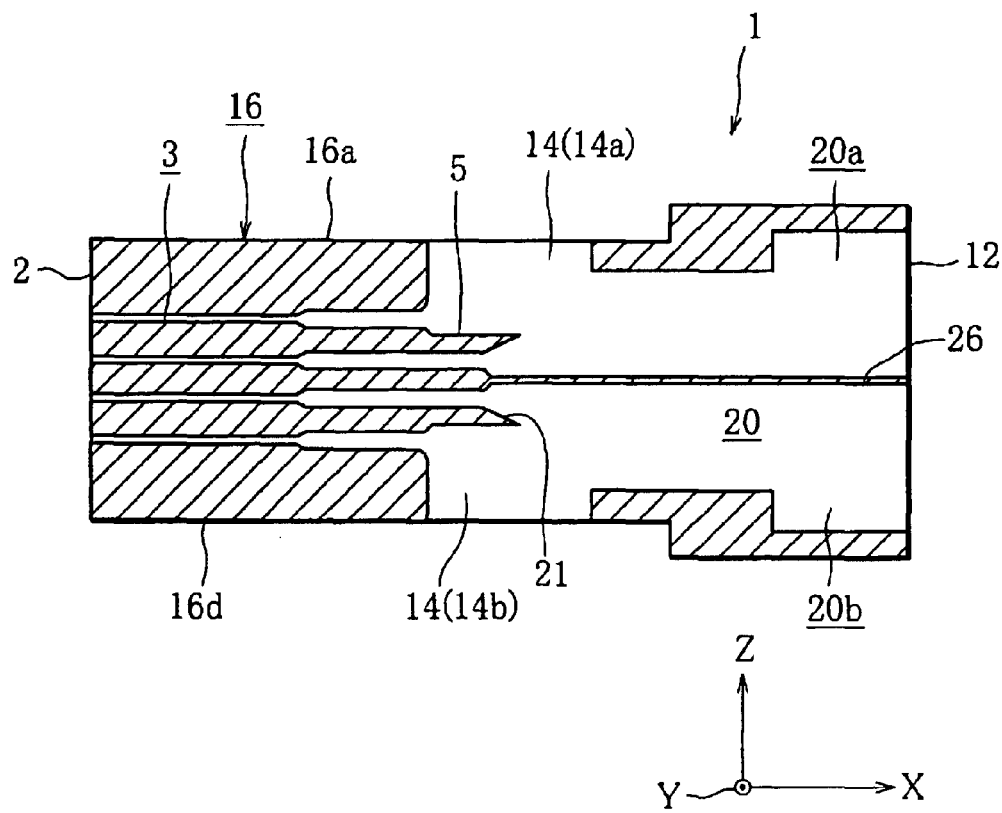
FIG. 14 is a sectional view showing a ferrule for optical connector of a fourth embodiment.

The following is a description of a fourth embodiment. According to this fourth embodiment, as shown in FIG. 14, a cavity 20 is provided with a partition 26. For other configurations, the fourth embodiment is similar to the third embodiment. In the description of the fourth embodiment to follow, therefore, like reference numerals are used to designate like components used in the ferrule 1 for optical connector of the third embodiment, and a repeated description of those components is omitted.

The partition 26 divides the cavity 20 in two, an upper cavity 20a and a lower cavity 20b. According to the fourth embodiment, the partition 26 is situated in a central position halfway between upper and lower surfaces 16a and 16d of a body 16. Thus, in this fourth embodiment, the body 16 is also symmetrical vertically and bilaterally as viewed from a joint end face 2.

In attaching a fiber ribbon 10 to the body 16 by injecting an adhesive agent into the cavity 20, according to the fourth embodiment, the adhesive agent is first injected into the upper cavity 20a through an upper injection hole 14a, for example, and is set. Thereafter, the adhesive agent is injected into the lower cavity 20b through a lower injection hole 14b and set. The fiber ribbon 10 is attached to the body 16 with the adhesive agent injected into the cavity 20 in this manner.

According to the fourth embodiment, as in the third embodiment, the injection holes 14a and 14b are formed individually in opposite regions in the upper and lower surfaces of the body 16. A bottom 21 is tiered from the center of a matrix of fiber holes 3 toward the upper and lower surfaces 16a and 16d. These configurations can produce the same effects of the third embodiment.

According to the third embodiment, the upper and lower injection holes 14a and 14b communicate with each other. Thus, when the adhesive agent is injected into the cavity 20 through the one injection hole 14a, for example, it leaks out of the other injection hole 14b. Supposedly, therefore, the adhesive agent cannot be filled well into the cavity 20. Accordingly, in the case of the third embodiment, it is advisable to inject the adhesive agent into the cavity 20 through one of the injection holes 14a and 14b with the other previously closed.

Since the cavity 20 of the fourth embodiment is provided with the cavity 20, on the other hand, there is no possibility of the adhesive agent injected through the one injection hole 14a leaking out through the other injection hole 14b. Thus, it is unnecessary to use a member to close one of the injection holes or to take the trouble to close the injection hole during the injection of the adhesive agent, so that the operation for adhesive agent injection can be facilitated.

Since the outside dimensions of the body 16 are standardized, the presence of the partition 26 inevitably lessens the height of the cavity 20 in the Z-axis direction. Preferably, therefore, the arrangement provided with the partition 26 should be applied to the case where the number of fiber ribbons 10 to be attached to the ferrule 1 for optical connector is 4 or less, for example.

According to the embodiments described above, each fiber ribbon is of a type that includes eight optical fibers. However, the number of optical fibers for each fiber ribbon is not limited to any specific value.

Further, each fiber hole 3 may includes a small-diameter portion and an inlet portion that different in diameter. Alternatively, each fiber hole 3 may be a through hole that has the same diameter throughout its length.

According to the third and fourth embodiments, the two injection holes 14a and 14b are opposed to each other. However, they need not be exactly opposed to each other and may be staggered. In this case, the respective states of contraction of the upper and lower surfaces 16a and 16d of the body 16 can be made to resemble each other as the body 16 is formed. Since the tensile force that is attributable to the adhesive agent can be applied substantially equally to the upper and lower surfaces 16a and 16d, moreover, deformation of the body 16 can be restrained in consequence.

The following is a description of an optical fiber bundle. The optical fiber bundle is used optically to connect two fiber ribbons to each other without using any ferrule.

Figure 15:
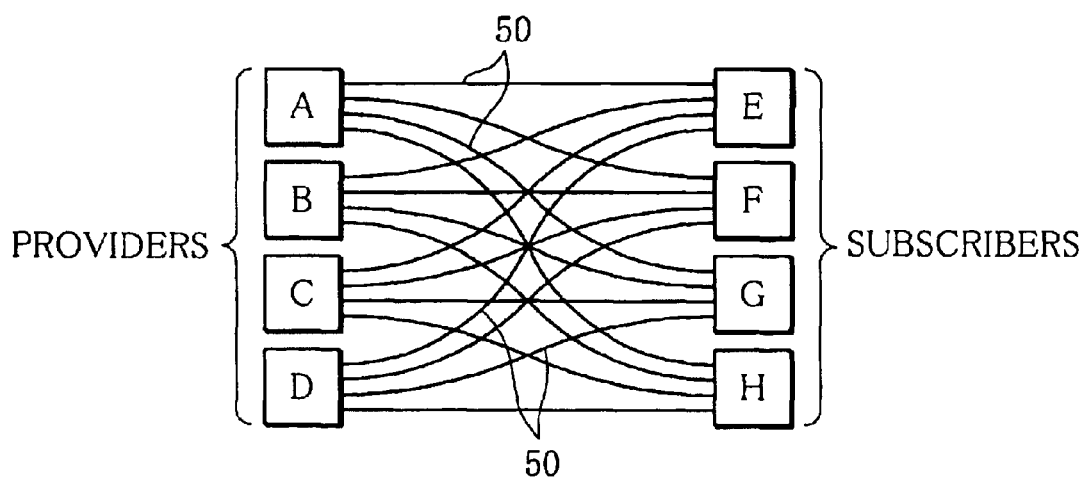
FIG. 15 is a model diagram showing an example of a conventional optical communication network congested with a large number of optical fibers.

With the progress of the modern optical communication networks, various information services have started to be widely provided through the optical communication networks. If there are information service providers A, B, C and D and subscribers E, F, G and H to be connected thereto, as shown in FIG. 15, for example, they must be connected by means of independent optical fibers 50.

In this case, the optical fibers 50 may cause congestion, so that an optical distributing board is used as means for canceling the congestion.

The optical distributing board includes a thin plastic plate, on which a plurality of optical fibers are fixed with a desired wiring pattern. In this case, each optical fiber must be fixed to the optical distributing board with a bending radius of 30 mm or more in order to avoid a bending loss. Accordingly, it is technically difficult to miniaturize the optical distributing board. Thus, a relay or the like that is furnished with the optical distributing board requires a wide layout space for the distributing board.

The optical fiber bundle described below can solve the foregoing problems. The optical fiber bundle is designed mainly to connect a plurality of optical fibers in a narrow layout space without using any optical distributing board.

Figure 16:
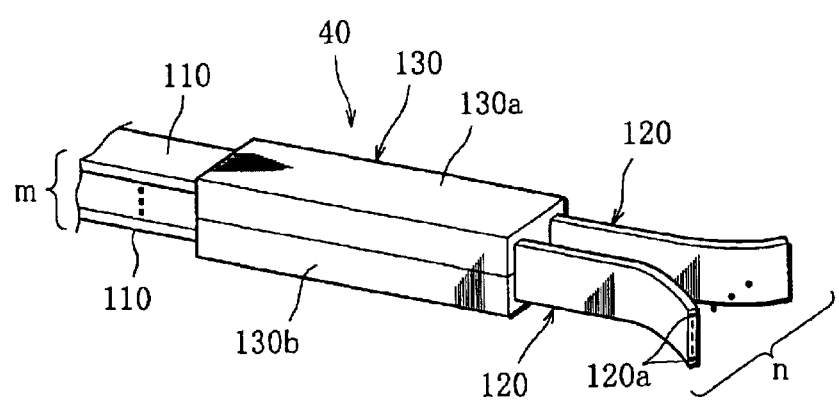
FIG. 16 is a perspective view showing an embodiment of an optical fiber bundle.

As shown in FIG. 16, an optical fiber bundle 40 includes m number of fiber ribbons 110, each of which includes n number of optical fibers arranged parallel to one another at given pitches. Both "m" and "n" are algebraic numbers that are indicative of natural numbers not smaller than 2.

The optical fiber bundle 40 converts an array of the respective first ends of the m number of fiber ribbons 110 into an array of n number of fiber ribbons 120 each of which includes m number of optical fibers. A conversional portion of the optical fiber bundle 40 is held in an enclosure 130, which has upper and lower lids 130a and 130b.

The optical fiber bundle 40 is manufactured in the following manner.

First, the m number of fiber ribbons 110 are stacked in their thickness direction, and one end of each ribbon is divided into n number of optical fibers.

Then, those optical fibers of the stacked fiber ribbons 110 which are arranged in the same position with respect to the longitudinal direction are lumped together. More specifically, all those optical fibers of the individual fiber ribbons 110 which are situated at one side end, for example, as viewed in the width direction of each fiber ribbon, are lumped together. Further, all those optical fibers which are situated adjacent to the lumped ones are lumped together. The same operation is carried out for every position, whereupon an array of the optical fibers on one side of the optical fiber bundle 40 is converted into another on the other side.

Thus, all those m number of optical fibers of the m number of fiber ribbons 110 which are situated at the one side end are lumped together, arranged parallel to one another, and fixed in a tape with an adhesive agent or the like. The resulting bundle of the m number of optical fibers is used as a first fiber ribbon 120.

Then, all those m number of optical fibers which are situated adjacent to the lumped ones are lumped together, successively arranged parallel to one another, and fixed in a tape with the adhesive agent. The resulting bundle is used as a second fiber ribbon 120.

Thereafter, similar operations are repeated in succession for third to n'th optical fibers, whereupon third to n'th fiber ribbons 120 are formed each including m number of optical fibers that are arranged parallel to one another.

Thus, the array of the m number of fiber ribbons 110 at one end of the optical fiber bundle 40 is converted into the array of the n number of fiber ribbons 120 each including m number of optical fibers 120a at the other end. In the converted array of the fiber ribbons 120, as shown in FIG. 16, the width direction in which the optical fibers 120a are arranged is perpendicular to the width direction of each fiber ribbon 110.

It is advisable for the operator accurately to align the optical fibers that are separated from the fiber ribbons 110 and fix them in a tape or ribbon. These processes of operation may be carried out automatically by means of a dedicated machine.

Thereafter, the conversional portion between the m number of fiber ribbons 110 and the n number of fiber ribbons 120, on the opposite sides of which the optical fiber array is converted, is held in the enclosure 130, whereupon the manufacture of the optical fiber bundle 40 is completed.

Figure 17:
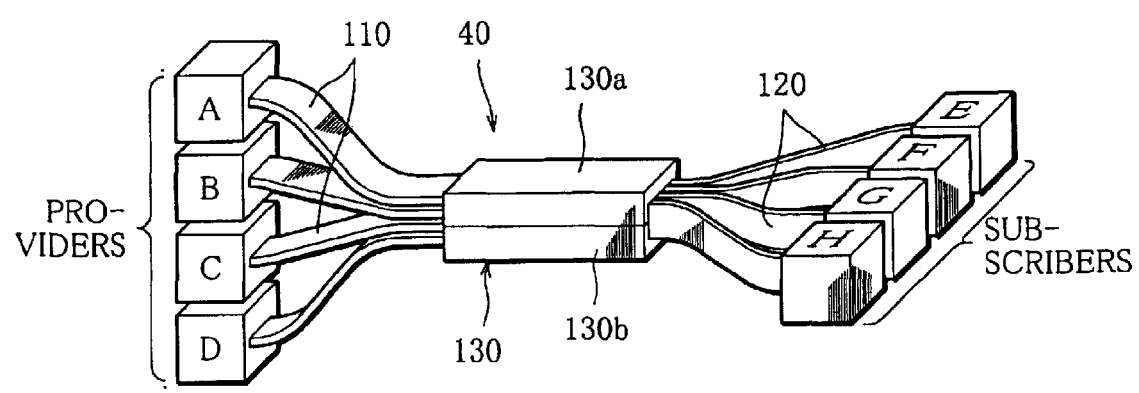
FIG. 17 is a perspective view showing an example of the way of use of the optical fiber bundle of FIG. 16.

The optical fiber bundle 40 manufactured in this manner is used to connect the information service providers A, B, C and D and the subscribers E, F, G and H to one another, as shown in FIG. 17, for example. In the optical fiber bundle 40, compared with the conventional optical distributing board shown in FIG. 15, a large number of optical fibers are lumped together by means of the fiber ribbons 110 and 120, so that there is no possibility of their causing congestion.

Further, the optical fiber bundle 40 can connect the optical fibers in a narrow layout space without using any optical distributing board.

In the optical fiber bundle 40 described above, moreover, those optical fibers of the m number of fiber ribbons 110 which are situated in the same array position are lumped together. However, the method for lumping the optical fibers is not regulated. For example, n number of fiber ribbons may be formed by lumping those m number of optical fibers of the fiber ribbons 110 in the optical fiber bundle which are situated in different array positions in the vertical direction.

What is claimed is:

1. A ferrule for a fiber ribbon having optical fibers, said ferrule comprising:
    a block-shaped body having a front end face and a rear end face;
    a plurality of through holes formed in said body, said through holes allowing the optical fibers to be inserted therein, individually;
    a hole array opening in the front end face of said body, said hole array being formed of a plurality of lines of said through holes arranged in a plurality of tiers, and having columns and rows of said through holes;
    a cavity formed in said body, said cavity extending from the rear end face of said body into said body, causing said through holes to open thereto as inlets, and accommodating one end portion of the fiber ribbon having the optical fibers to be inserted individually into said through holes;
    an insertion opening formed in the rear end face of said body, said insertion opening allowing said cavity to open in the rear end face of said body and receiving the optical fibers to be inserted individually into said through holes;
    a tiered bottom forming a bottom of said cavity, said tiered bottom having a plurality of projections each formed with corresponding inlets of said through holes and guide grooves by which the optical fibers are guided toward the corresponding inlets of said through holes, respective positions of said projections of said tiered bottom being differentiated in stages between adjacent columns of said hole array so that said tiered bottom has a staircase-shape symmetrical with respect to a center as viewed in a direction of said rows of said hole array; and
    an opening formed in one of outer surfaces of said body, parallel to rows of said hole array, said opening allowing said tiered bottom to be exposed through the one outer surface.

2. The ferrule according to claim 1, wherein the positions of the respective starting ends of said guide grooves are differentiated in stages from the center to both sides as viewed in the direction of the rows of the hole array.

3. The ferrule according to claim 1, wherein said tiered bottom has the shape of a staircase symmetrical with respect to the center as viewed in the direction of said rows of said hole array.

4. The ferrule according to claim 3, wherein said staircase has the lowest stair in the center as viewed from the rear end side of said body.

5. The ferrule according to claim 3, wherein said staircase has the highest stair in the center as viewed from the rear end side of said body.

6. The ferrule according to claim 1, wherein said tiered bottom has the shape of a staircase substantially symmetrical with respect to the center as viewed in the direction of the rows of said hole array.

7. The ferrule according to claim 6, wherein said staircase has the lowest stair in the center as viewed from the rear end side of said body.

8. The ferrule according to claim 6, wherein said staircase has the highest stair in the center as viewed from the rear end side of said body.

9. The ferrule according to claim 1, wherein said opening includes an edge having a shape similar to said tiered bottom.

10. A connecting method for fiber ribbons each having optical fibers, comprising the steps of:

preparing a ferrule having a hole array formed of a plurality of lines of through holes arranged in a plurality of tiers, said hole array including columns and rows of said through holes, and inlet positions for inserting the optical fibers therein, wherein the inlet positions are differentiated in stages, as viewed from between adjacent columns of the hole arrays so that the inlet positions are symmetrically arranged with respect to a center as viewed in a direction of said rows of said hole array;

recognizing one of columns of through holes from outside the ferrule;

passing the optical fibers of one of the fiber ribbons individually along guide grooves located in positions short of the recognized column of through holes;

repeating the steps of recognition and passage for the number of necessary fiber ribbons;

bonding and fixing all the passed fiber ribbons to the ferrule; and connecting two ferrules having the fiber ribbons fixed thereon by butting.

11. A ferrule for a fiber ribbon having optical fibers, said ferrule comprising:

a block-shaped body having a front end face and a rear end face;

a hole array formed in said body, said hole array being formed of a plurality of lines of through holes capable of being penetrated by the optical fibers of the fiber ribbon, individually, and arranged in a plurality of tiers so that said hole array includes columns and rows of said through holes, and inlets for inserting the optical fibers therein;

a cavity extending from the rear end face of said body into said body and causing the inlets of said hole array to open thereto;

a tiered bottom forming a bottom of said cavity in a manner such that respective inlet positions of said hole array are differentiated in stages between vertically lapping tiers of said hole array so that the inlet positions are symmetrically arranged with respect to a center as viewed in a direction of said columns of said hole array; and openings formed individually in the opposite outer surfaces of said body parallel to said rows of said hole array, said openings allowing said tiered bottom to be exposed through the opposite outer surfaces.

12. The ferrule according to claim 11, further comprising guide grooves formed in said tiered bottom and extending from positions short of the respective inlets of said through holes toward the inlets.

13. The ferrule according to claim 11, wherein said openings are formed individually in opposite positions on the opposite outer surfaces of said body.

14. The ferrule according to claim 11, wherein the positions of the respective starting ends of said guide grooves are differentiated in stages from the center toward upper and lower tiers as viewed in the vertical direction of said hole array.

15. The ferrule according to claim 11, wherein said tiered bottom has the shape of a staircase including upper and lower tiers symmetrical with respect to the center as viewed in the vertical direction of said hole array.

16. The ferrule according to claim 11, wherein said staircase has the highest stair in the center as viewed from the rear end side of said body.

17. The ferrule according to claim 11, wherein said staircase has the highest stair in the center as viewed from the rear end side of said body, the respective inlets of the through holes opening in the highest stair.

18. The ferrule according to claim 11, further comprising a partition wall dividing the cavity in two and isolating the openings on the opposite outer surfaces.

19. An optical fiber bundle comprising: m number of fiber ribbons each including n number of optical fiber arranged in a row; and n number of fiber ribbons connecting with the respective first ends of the m number of fiber ribbons and each including m number of optical fibers arranged in a column, wherein the n number fiber ribbons are configured to be connected to the m number of fiber ribbons via a tiered bottom forming a bottom of a cavity of a connector, said tiered bottom having a plurality of projections each formed with corresponding inlets and guide grooves by which the optical fibers are guided, respective positions of said projections of said tiered bottom being differentiated in stages between adjacent columns of said hole array so that said tiered bottom has a staircase-shape symmetrical with respect to a center as viewed in a direction of said rows of said hole array.

20. The optical fiber bundle according to claim 19, wherein the respective first ends of said m number of fiber ribbons have bundles formed by lumping all the optical fibers in the same position with respect to the longitudinal direction of the arrays of the optical fibers, the n number of fiber ribbons connecting individually with the bundles.

21. A method for connecting a plurality of devices by means of optical fibers, comprising the steps of connecting m number of fiber ribbons, each including n number of optical fibers arranged in a row, to optical devices owned by m number of providers, individually; diverging n number of fiber ribbons via a connector, each including m number of optical fibers arranged in a column, from said m number of fiber ribbons, wherein the connector comprise a tiered bottom having a plurality of projections each formed with corresponding inlets and guide grooves by which the optical fibers are guided, respective positions of said projections of said tiered bottom being differentiated ins stases between adjacent columns of said hole array so that said tiered bottom has a staircase-shape symmetrical with respect to a center as viewed in a direction of said rows of said hole array; and connecting said n number of fibers ribbons to optical devices owned by n number of subscribers, individually.

* * * * *

UNITED STATES PATENT AND TRADEMARK OFFICE
CERTIFICATE OF CORRECTION

PATENT NO. : 6,799,900 B2
DATED : October 5, 2004
INVENTOR(S) : Shiino et al.

It is certified that error appears in the above-identified patent and that said Letters Patent is hereby corrected as shown below:

Column 12,
Line 37, after "body" delete ",".

Column 14,
Line 41, after "steps of" insert -- : --.
Line 51, delete "ins" and insert therefore, -- in --.
Line 51, delete "stases" and insert therefore, -- stages --.

Signed and Sealed this

Twenty-second Day of November, 2005

JON W. DUDAS
*Director of the United States Patent and Trademark Office*